us009669782B2

(12) United States Patent
Suzuki et al.

(10) Patent No.: US 9,669,782 B2
(45) Date of Patent: Jun. 6, 2017

(54) ELECTRIC POWER SUPPLY DEVICE USING ELECTRIC VEHICLE

(71) Applicant: MITSUBISHI JIDOSHA KOGYO KABUSHIKI KAISHA, Tokyo (JP)

(72) Inventors: Takafumi Suzuki, Anjo (JP); Hiroyasu Suzuki, Nagoya (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 168 days.

(21) Appl. No.: 14/750,425

(22) Filed: Jun. 25, 2015

(65) Prior Publication Data
US 2015/0291111 A1  Oct. 15, 2015

Related U.S. Application Data

(63) Continuation of application No. PCT/JP2013/083112, filed on Dec. 10, 2013.

(30) Foreign Application Priority Data

Dec. 26, 2012  (JP) .................................. 2012-282669

(51) Int. Cl.
*B60L 1/00* (2006.01)
*B60L 3/00* (2006.01)
(Continued)

(52) U.S. Cl.
CPC ............ *B60R 16/033* (2013.01); *B60L 11/18* (2013.01); *B60R 16/04* (2013.01); *H01M 10/44* (2013.01);
(Continued)

(58) Field of Classification Search
CPC .......... H02J 7/0052; H02J 7/0065; H02J 7/14; B60R 16/033; B60L 11/18; H01M 10/44; H01M 10/48
(Continued)

(56) References Cited

U.S. PATENT DOCUMENTS 5,717,256 A  2/1998 Okumura et al.
6,104,160 A  8/2000 Iwata et al.
(Continued)

FOREIGN PATENT DOCUMENTS

JP  8-54940 A  2/1996
JP  11-178234 A  7/1999
(Continued)

OTHER PUBLICATIONS

Extended European Search Report dated Aug. 22, 2016 issued in corresponding EP Patent Application No. 13 86 7571.

*Primary Examiner* — Carlos Amaya
(74) *Attorney, Agent, or Firm* — Birch, Stewart, Kolasch & Birch, LLP (57) ABSTRACT

Discharge of electricity from a drive battery is started, and after a lapse of a predetermined time from the start of supply of electric power to a V2X device or power source apparatus, quick charging contactors are opened (S10-S16) and then failure diagnosis is executed (S18). If a failure is detected, a warning is initiated and restart of the electric power supply is inhibited (S20, S20, S32, S34). On the other hand, if no failure is detected, an open circuit voltage is detected, and the remaining capacity of the drive battery is calculated based on the open circuit voltage (S24-S26). The calculated remaining battery capacity is memorized (S28). Subsequently, the electric power supply from the drive battery to the V2X device or power source apparatus is restarted (S30).

15 Claims, 3 Drawing Sheets (51) Int. Cl.
*H02G 3/00* (2006.01)
*B60R 16/033* (2006.01)
*B60L 11/18* (2006.01)
*H01M 10/44* (2006.01)
*H01M 10/48* (2006.01)
*B60R 16/04* (2006.01)
*H02J 7/00* (2006.01)
*H02J 7/14* (2006.01)
*H02J 3/32* (2006.01)

(52) U.S. Cl.
CPC ......... *H01M 10/48* (2013.01); *H02J 7/0052* (2013.01); *H02J 7/0065* (2013.01); *H02J 7/14* (2013.01); *H02J 3/32* (2013.01); *Y02E 60/721* (2013.01); *Y04S 10/126* (2013.01)

(58) Field of Classification Search
USPC ........................................................ 307/10.1
See application file for complete search history.

(56) References Cited

U.S. PATENT DOCUMENTS

| | | |
|---|---|---|
| 2009/0024338 A1 | 1/2009 | Suzuki |
| 2010/0017045 A1 | 1/2010 | Nesler et al. |
| 2010/0318252 A1 | 12/2010 | Izumi |
| 2011/0121779 A1 | 5/2011 | Ichikawa et al. |
| 2013/0082663 A1 | 4/2013 | Mori et al. |
| 2014/0002011 A1 | 1/2014 | Ang et al. |
| 2014/0002024 A1* | 1/2014 | Ang ............... H02J 7/0036 320/109 |

FOREIGN PATENT DOCUMENTS

| | | |
|---|---|---|
| JP | 2004-245673 A | 9/2004 |
| JP | 2005-204363 A | 7/2005 |
| JP | 2010-35277 A | 2/2010 |
| JP | 2012-70577 A | 4/2012 |
| JP | 2012-182892 A | 9/2012 |

* cited by examiner

ELECTRIC POWER SUPPLY DEVICE USING ELECTRIC VEHICLE

CROSS REFERENCE TO RELATED APPLICATIONS

This application is a Continuation of PCT International Application No. PCT/JP2013/083112, filed on Dec. 10, 2013, which claims priority under 35 U.S.C. 119(a) to Patent Application No. 2012-282669, filed in Japan on Dec. 26, 2012, all of which are hereby expressly incorporated by reference into the present application.

TECHNICAL FIELD

The present invention relates to an electric power supply device using an electric vehicle.

BACKGROUND ART

In conventional electric vehicles such as an electric vehicle or hybrid vehicle capable of traveling by means of its own electric motor, a large-capacity storage battery (drive battery) for the vehicle is provided which can store a large amount of high-voltage electric power for driving the electric motor and which is charged by electric power supplied from an external charging apparatus located outside of the vehicle. The drive battery is provided with contactors for on/off of supplying electric power from the external charging apparatus.

Also, in this type of electric vehicle, when the vehicle is put into operation, an SOC (State of charge), which indicates the remaining capacity of the drive battery, is detected from the open circuit voltage of the drive battery, and in addition, failure diagnosis is performed by opening and closing the contactors provided in the drive battery, to detect adhesion of the contactors and electric leak in the drive battery.

A power supply system using an electric vehicle has been developed in which, in order to secure operability of an externally connected device such as electrical equipment at home or a household electrical appliance in cases where the supply of electric power from an electric power provider is unavailable at the time of disaster, for example, or where the vehicle is at a place away from home and there is no power supply available, the externally connected device is connected to the vehicle being parked, and the high-voltage electric power stored in the drive battery of the vehicle is supplied to the externally connected device (Patent Document 1).

CITATION LIST

Patent Literature

Patent Document 1: Japanese Unexamined Patent Publication No. H11-178234

SUMMARY OF INVENTION

Technical Problem

In the case of the household power supply system using an electric vehicle disclosed in Patent Document 1, once an externally connected device is connected to the vehicle being parked, electric current keeps flowing from the drive battery to the externally connected device or vice versa. Thus, while the externally connected device is connected, current is always flowing in the drive battery, so that it is difficult to make a diagnosis of failure such as sticking or adhesion of the contactors provided in the drive battery or electric leak in the drive battery.

Also, while current is flowing in the drive battery, the remaining battery capacity is estimated from an integrated value of the current. However, the remaining battery capacity obtained from the integrated value of the current has low accuracy, compared with the remaining battery capacity detected from the open circuit voltage, and sometimes fails to represent an actual remaining battery capacity.

A difference between the estimated remaining battery capacity and the actual remaining battery capacity may possibly lead to an undesirable situation that the actually usable remaining battery capacity becomes considerably low or that a risk of degradation of the drive battery by over-discharging or overcharging may be caused.

The present invention was made to solve the above problem, and an object thereof is to provide an electric power supply device using an electric vehicle, which enables carrying out failure diagnosis and detecting a remaining battery capacity even while an externally connected device is connected to the vehicle.

Solution to Problem

To achieve the above object, a first aspect of the invention provides an electric power supply device using an electric vehicle, including: a drive battery installed in the electric vehicle, supplying electric power charged therein to an electric motor for driving the electric vehicle and also to outside of the electric vehicle; an externally connected unit arranged external to the electric vehicle, converting the electric power supplied from the drive battery and supplying the converted electric power to an electrical device located outside of the electric vehicle; an electric power on/off unit for on/off of supplying electric power from the drive battery to the externally connected unit; an operation control unit that causes the electric power on/off unit to shut off supplying the electric power from the drive battery to the externally connected unit, when a predetermined time has elapsed after start of supplying the electric power from the drive battery to the externally connected unit; and a state detection unit that detects a state of the drive battery when supplying the electric power is shut off by the electric power on/off unit.

According to a second aspect of the invention, in the electric power supply device of the first aspect, the predetermined time is a period of time from start of supplying the electric power from the drive battery to the externally connected unit until a remaining capacity of the drive battery decreases to a predetermined value or below.

According to a third aspect of the invention, in the electric power supply device of the second aspect, the state detection unit calculates the remaining capacity of the drive battery based on a current supplied from the drive battery to the externally connected unit when the electric power is supplied from the drive battery to the externally connected unit.

According to a fourth aspect of the invention, in the electric power supply device of any one of the first through third aspects, the state detection unit detects a failure in the drive battery and also a failure in the electric power on/off unit when supplying the electric power is shut off by the electric power on/off unit.

According to a fifth aspect of the invention, in the electric power supply device of any one of the first through fourth aspects, the state detection unit includes a voltage detection unit that detects an open circuit voltage of the drive battery, and the state detection unit calculates a remaining capacity of the drive battery based on a result of detection by the voltage detection unit when supplying the electric power is shut off by the electric power on/off unit.

According to a sixth aspect of the invention, in the electric power supply device of the fifth aspect, when the remaining capacity of the drive battery is calculated based on the result of detection by the voltage detection unit, the state detection unit erases a memorized remaining capacity of the drive battery calculated based on a current supplied from the drive battery to the externally connected unit, and memorizes the remaining capacity of the drive battery calculated based on the result of detection by the voltage detection unit.

According to a seventh aspect of the invention, in the electric power supply device of any one of the first through sixth aspects, the externally connected unit includes a reserve power supply unit that is charged by electric power supplied from the drive battery or by electric power supplied from a power supply located outside of the electric vehicle, and the reserve power supply unit supplies electric power to the externally connected unit when supplying the electric power is shut off by the electric power on/off unit.

Advantageous Effects of Invention

According to the invention, when a predetermined time has elapsed after start of supplying the electric power from the drive battery to the externally connected unit, the electric power on/off unit is operated to shut off supplying the electric power from the drive battery to the externally connected unit. Then, when supplying the electric power from the drive battery to the externally connected unit is being shut down, the state of the drive battery is detected.

Since supplying the electric power from the drive battery to the externally connected unit is shut down after the predetermined time, as necessary a diagnosis can be carried out for a failure that cannot be detected while the electric power is supplied from the drive battery to the externally connected unit. By shutting down supplying the electric power from the drive battery to the externally connected unit, it becomes possible to carry out a diagnosis of failures of, for example, electric leak in the drive battery and adhesion of the electric power on/off unit, which cannot be detected when the electric power is being supplied from the drive battery to the externally connected unit, or when current is flowing in the drive battery. When supplying the electric power from the drive battery to the externally connected unit is shut down, since the open circuit voltage of the drive battery becomes detectable, it becomes possible to calculate with high accuracy the remaining battery capacity, by calculating remaining capacity of the drive battery on the basis of the open circuit voltage.

DESCRIPTION OF EMBODIMENTS

Embodiments of the present invention will be described below with reference to the drawings.

Figure 1:
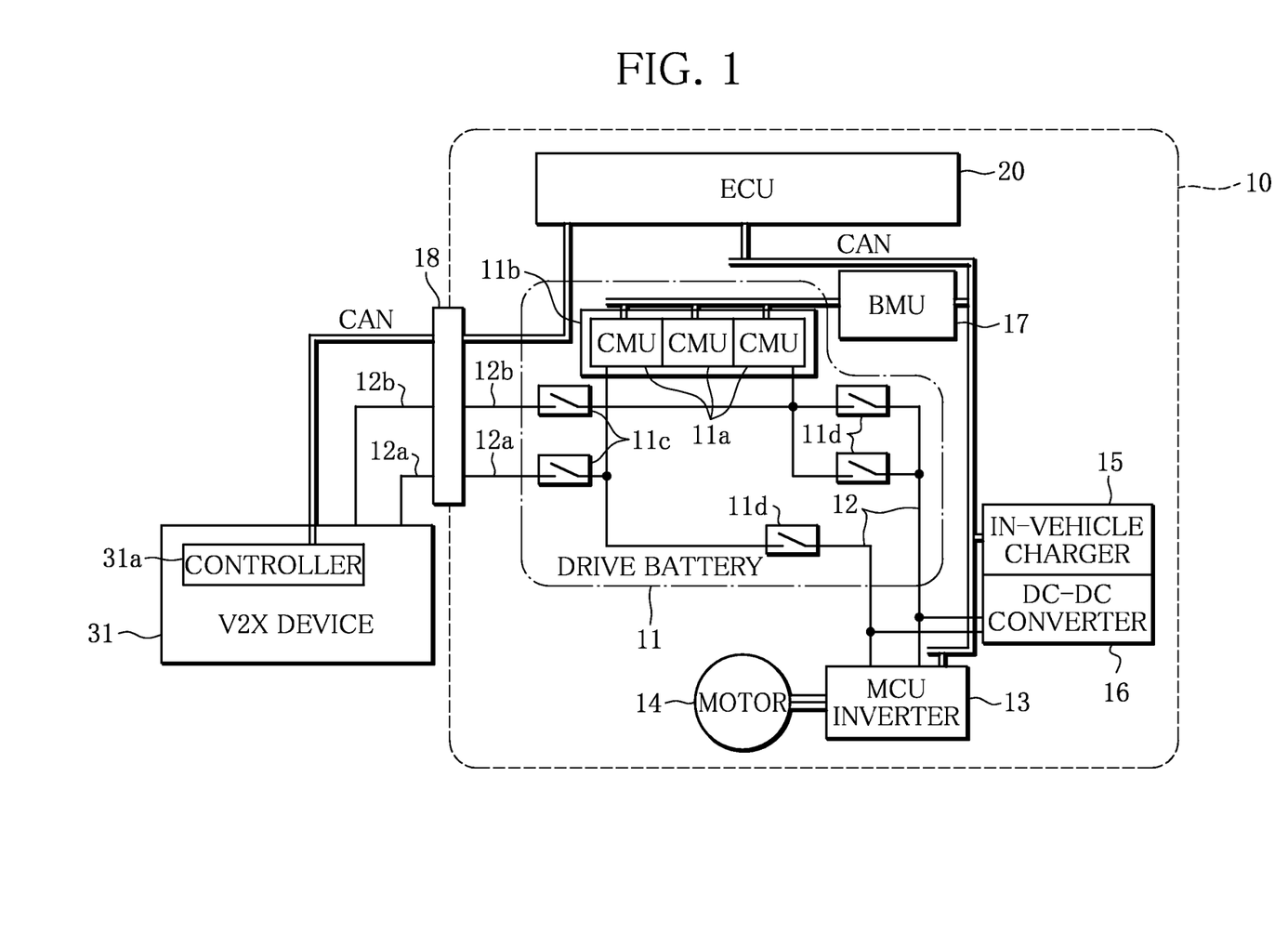
FIG. 1 illustrates a schematic configuration of an electric power supply device using an electric vehicle according to the present invention, wherein a V2X device is used as an externally connected device.
Figure 2:
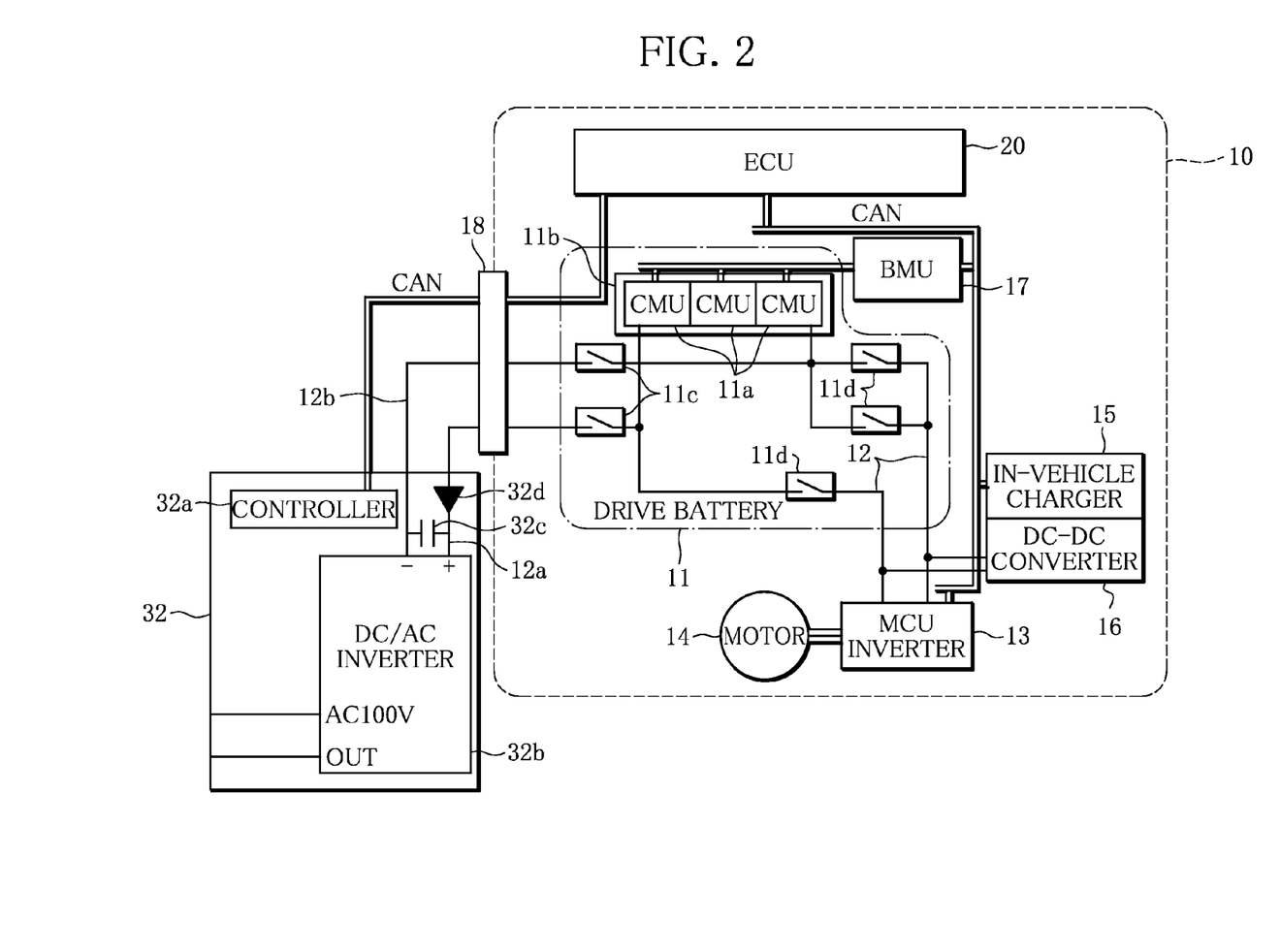
FIG. 2 schematically illustrates the configuration of the electric power supply device of the present invention, wherein a power source apparatus is used as the externally connected device.

FIG. 1 illustrates a schematic configuration of an electric power supply device using an electric vehicle according to the present invention, wherein a V2X device is used as an externally connected device. FIG. 2 schematically illustrates the configuration of the electric power supply device of the present invention, wherein a power source apparatus is used as the externally connected device. In the figures, solid lines indicate a high-voltage circuit 12, and double lines indicate communication lines of a control area network. Also, in the figures, the broken line indicates a vehicle 10, the dashed-single dotted line indicates a drive battery 11, and the dashed-double dotted line indicates a battery module 11b. In FIGS. 1 and 2, the illustration of an electrical device, as a household electrical appliance, that is connected to a V2X device 31 or a power source apparatus 32 is omitted. Similarly, in-vehicle devices operated at low voltage and low-voltage circuits are not illustrated. In the following, the configuration of the electric power supply device using an electric vehicle will be described.

As illustrated in FIGS. 1 and 2, the electric power supply device of the invention generally comprises the electric vehicle 10 equipped with the drive battery 11, and, as an externally connected device, the V2X device (externally connected unit) 31 that is supplied with electric power from the drive battery 11 or the power source apparatus (externally connected unit) 32.

The vehicle 10 is an electric vehicle equipped, as a traveling device for the vehicle 10, with a motor (electric motor) 14 which is supplied with high voltage electric power from the drive battery 11 via the high voltage circuit 12 and of which the operation is controlled by a motor control unit-inverter (hereinafter MCU-inverter) 13. A charging cable extending from an external charging apparatus is connected to a charging inlet lid of the vehicle 10, so that the drive battery 11 can be charged by an in-vehicle charger 15. The drive battery 11 of the electric vehicle 10 can also be charged in a short period of time using quick charging equipment, not shown, without using the in-vehicle charger 15.

As shown in FIG. 1, the vehicle 10 includes the drive battery 11, the MCU-inverter 13, the motor 14, the in-vehicle charger 15, a DC-DC converter 16, a battery monitoring unit (BMU) (state detection unit, voltage detection unit) 17, and an electronic control unit 20. The MCU-inverter 13, the in-vehicle charger 15, the battery monitoring unit 17 and the electronic control unit (state detection unit, operation control unit) 20 are electrically connected by the communication lines of the control area network. The vehicle 10 is also equipped with a warning device, not shown, for notifying failure.

The drive battery 11 is a secondary battery such as a lithium-ion battery. The drive battery 11 includes the battery module 11b constituted by a plurality of modules, each of which includes a plurality of cells and a cell monitoring unit (CMU) 11a for monitoring the cells. The drive battery 11 supplies high-voltage DC power to the MCU inverter 13 via the high-voltage lines 12 provided with main contactors 11d, and the MCU-inverter 13 supplies AC drive power to the motor 14. The in-vehicle charger 15 and the DC-DC converter are connected to an external household AC power supply of 100 V or 200 V, for example, to charge the drive battery 11 by this household AC power supply.

The drive battery 11 may alternatively be supplied with high-voltage (e.g. 300 V DC) power from an external charging apparatus via the in-vehicle charger 15, to be charged in a short period of time, for which a connection unit 18 connecting a quick charger is provided on the vehicle body. The quick charging high-voltage lines 12a, 12b connecting between the connection part 18 and the battery module 11b are provided with the quick charging contactors (electric power on/off unit) 11c which connect and disconnect the respective high-voltage lines. The quick charging high-voltage lines 12a, 12b are connected further to the high-voltage lines 12.

By connecting an externally connected device such as the V2X device 31 or the power source apparatus 32 to the connection unit 18, it is possible to supply electric power from the drive battery 11 to an electrical device connected to the externally connected device, namely, the V2X device 31 or the power source apparatus 32. It should be noted that the operation of the quick charging contactors 11c is controlled by the battery monitoring unit 17 but may alternatively be controlled directly by the electronic control unit 20. In either case, the electronic control unit 20 detects the connection of the V2X device 31 or the power source apparatus 32 to the connection unit 18, and after confirmation via CAN that the operation of the V2X device 31 or the power source apparatus 32 is ready, the operation (connection) of the quick charging contactors 11c is controlled.

The battery monitoring unit 17 monitors the temperature, open circuit voltage, remaining battery capacity (SOC) and the like of the battery module 11b on the basis of output data from the cell monitoring units 11a. Also, the battery monitoring unit 17 monitors the current value of the drive battery 11 by means of a current sensor (not shown) provided in a path through which the current of the drive battery 11 passes. The current sensor is usually provided in the vicinity of the quick charging contactors 11c or the main contactors 11d taking account of the wiring with respect to the battery monitoring unit 17, but may be provided appropriately at any positions of the high-voltage lines 12 or the quick charging high-voltage lines 12a, 12b. Alternatively, a single current sensor may be connected to either one of the quick charging high-voltage lines 12a and 12b at a location closer to the battery modules 11a than the junction between the quick charging high-voltage line 12a, 12b and the corresponding high-voltage line 12, to measure the current flowing through the quick charging high-voltage lines 12a, 12b and through the high-voltage lines 12. The current sensor may be provided at either the + side or the − side of the high-voltage lines.

While the drive battery 11 is connected to power lines, the remaining battery capacity is calculated based on an integrated value of the current. On the other hand, while the drive battery 11 is not connected to power lines, the remaining battery capacity is calculated based on the open circuit voltage of the drive battery 11. The battery monitoring unit 17 and the cell monitoring units 11a are electrically connected by the communication lines of the control area network.

The electronic control unit 20 is a control device for performing integrated control of the vehicle 10 and includes input/output devices, storage devices (ROM, RAM, non-volatile RAM, etc.), a central processing unit (CPU), and timers.

The electronic control unit 20, the MCU inverter 13, the vehicle-mounted charger 15, the DC-DC converter 16, the battery monitoring unit 17, and the V2X device 31 or the power source apparatus 32 are interconnected by the CAN. The electronic control unit 20 acquires state data of these devices via the CAN.

The electronic control unit 20 sends a command to the battery monitoring unit 17 to perform charging-discharging control of the drive battery 11. Also, the electronic control unit 20 sends a command to the MCU of the MCU inverter 13 to control opening and closing of the main contactors 11d (open the main contactors 11d), and controls the operation of the inverter to run or stop the vehicle 10. Further, the electronic control unit 20 controls on/off of the quick charging contactors 11c via the battery monitoring unit 17, to control supplying power to the externally connected device, namely, the V2X device 31 or the power source apparatus 32, or supplying electric power from a quick charger.

The V2X device 31 shown in FIG. 1 converts the direct-current power stored in the drive battery 11 of the vehicle 10 to alternating-current power at a voltage that can be supplied to an electrical device at home, such as a household electrical appliance, and supplies the converted power to the electrical device in case of emergency or for the purpose of energy saving. That is, the V2X device 31 connected to the vehicle 10 enables a household electrical appliance to operate without using the electric power supplied by an electric power provider or the electric power generated at home. Also, when the remaining capacity of the drive battery 11 is low, the V2X device 31 may be connected to the vehicle 10, and in this case, the V2X device 31 converts the electric power supplied by an electric power provider or generated at home to direct-current power at a voltage that can be stored in the drive battery 11, and charges the drive battery 11.

The V2X device 31 includes a controller (state detection unit, operation control unit) 31a and a warning device, not shown, for notifying a failure.

The controller 31a controls supplying the electric power stored in the drive battery 11 to an electrical device connected to the V2X device 31, as well as supplying the electric power supplied by an electric power provider or generated at home to the vehicle 10. To this end, the controller 31a sends a power supply request signal to the electronic control unit 20 via the CAN, and the electronic control unit 20 sends a command to the battery monitoring unit 17 to close the quick charging contactors 11c and to supply electric power to the V2X device 31.

As shown in FIG. 2, the power source apparatus 32 includes a controller (state detection unit, operation control unit) 32a, a DC/AC inverter 32b, a capacitor (reserve power supply unit) 32c, a diode 32d, and a warning device, not shown, for notifying failure.

The controller 32a controls the operation of the DC/AC inverter 32b. Specifically, the controller 32a controls supplying electric power to an electrical device connected to the power source apparatus 32. To this end, the controller 32a sends a power supply request signal to the electronic control unit 20 via the CAN, and the electronic control unit 20 sends a command to the battery monitoring unit 17 to close the quick charging contactors 11c and to supply electric power to the power source apparatus 32.

The DC/AC inverter 32b converts the direct-current electric power stored in the drive battery 11 to alternating-current power at a voltage that can be supplied to the connected electrical device, and supplies the converted power to the electrical device.

The capacitor 32c is provided at the input side of the DC/AC inverter 32b and connected between the quick charging high-voltage lines 12a and 12b. When electric power is supplied from the drive battery 11 of the vehicle 10 to the power source apparatus 32 with the quick charging contactors 11c closed, the capacitor 32c temporarily stores part of the electric power supplied thereto. For the capacitor 32c, an electric double-layer capacitor is used, for example.

The diode 32d is connected in series with the quick charging high-voltage line 12a at a location closer to the vehicle 10 than the capacitor 32c and in such a direction that electric power can be supplied to the power source apparatus 32. The diode 32d prevents the electric power stored in the capacitor 32c from flowing back to the vehicle 10.

A main purpose of the power source apparatus 32 is to supply electric power to an electrical device when there is no power supply device available, as in the case where the vehicle 10 is at a place away from home. Specifically, the power source apparatus 32 converts the direct-current power stored in the drive battery 11 of the vehicle 10 to alternating-current power at a voltage that can be supplied to an electrical device such as a household electrical appliance, while storing the direct-current power in the capacitor 32c, and supplies to the converted power to the electrical device. When the quick charging contactors 11c is shut off, and then supplying the electric power from the drive battery 11 of the vehicle 10 is stopped, the power source apparatus 32 converts the electric power stored in the capacitor 32c to alternating-current power at a voltage suited to the electrical device, and supplies the converted power to the electrical device. That is, the power source apparatus 32 connected to the vehicle 10 enables the use of an electrical device when the vehicle 10 is at a place away from home, for example.

It is also possible to supply electric power to the power source apparatus 32 by connecting an external 100 V or 200 V AC power supply available at home to the in-vehicle charger 15.

After a predetermined time from the starting supplying electric power from the drive battery 11 of the vehicle 10 to an electrical device via the V2X device 31 or the power source apparatus 32 has elapsed, that is, after such a period of time in which the remaining capacity of the drive battery 11 decreases to a predetermined value or below, the electronic control unit 20 executes controlling drive battery failure diagnosis to diagnose electric leak in the drive battery 11, adhesion of the quick charging contactors 11c, and the like. It should be noted that controlling drive battery failure diagnosis may be executed either by the electronic control unit 20 or by the battery monitoring unit 17.

It will be described below about controlling drive battery failure diagnosis, which is executed by either the electronic control unit 20 or the battery monitoring unit 17 of the electric power supply device of the present invention.

Figure 3:
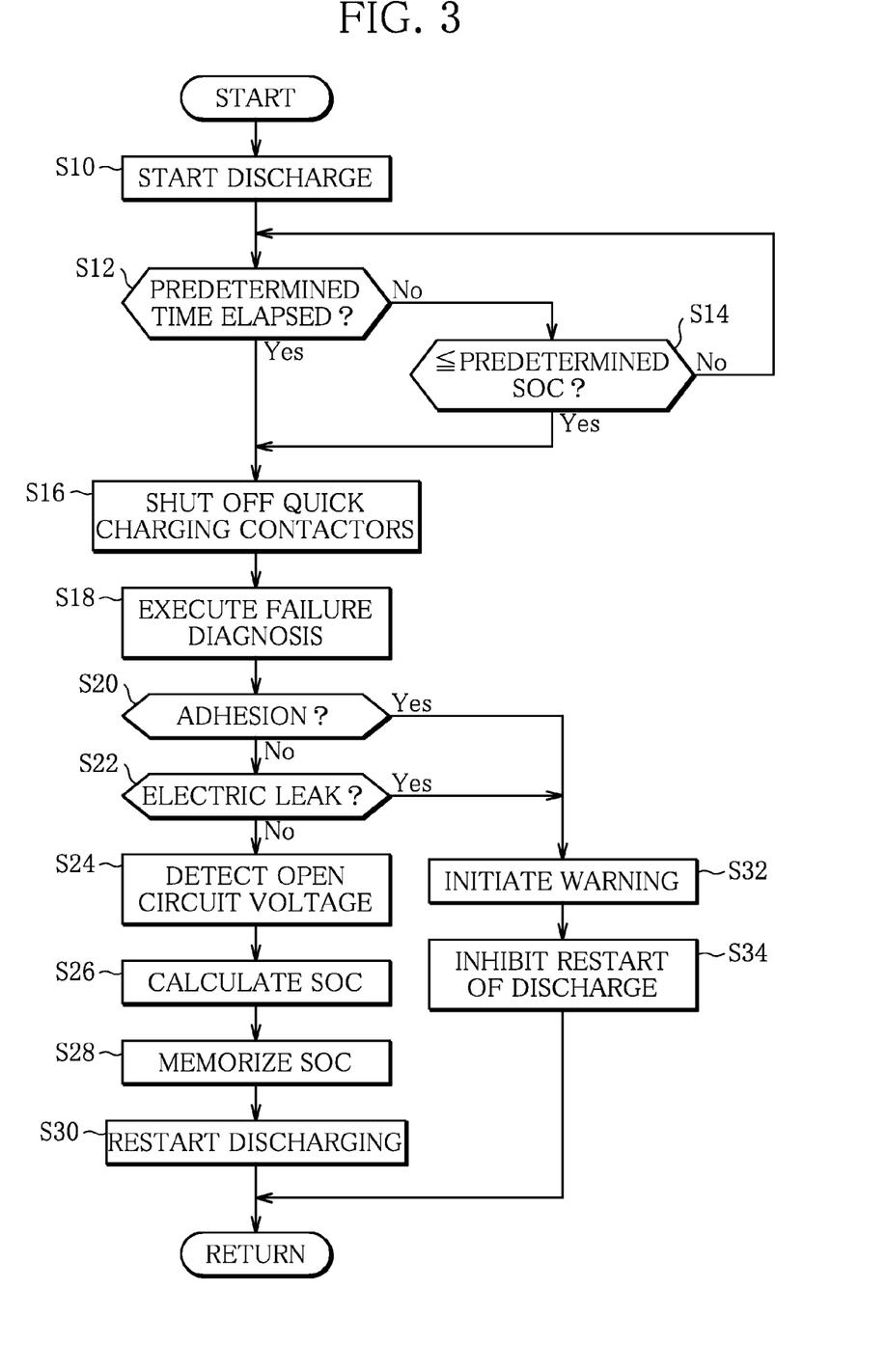
FIG. 3 is a control flowchart illustrating a control of drive battery failure diagnosis executed by the electric power supply device of the present invention.

FIG. 3 illustrates a flowchart of controlling the drive battery failure diagnosis executed in the electric power supply device of the present invention. It should be noted that controlling failure diagnosis is executed when the drive battery 11 of the vehicle 10 starts discharging electricity to the V2X device 31 or to the power source apparatus 32, that is, when the electric power supply from the drive battery 11 of the vehicle 10 to the V2X device 31 or to the power source apparatus 32 is started.

As shown in FIG. 3, discharging of the drive battery 11 is started in Step S10. That is, supplying electric power from the drive battery 11 of the vehicle 10 to the V2X device 31 or to the power source apparatus 32 is started. Then it proceeds to Step S12.

In Step S12, it is determined whether or not the predetermined time has elapsed. In particular, it is determined that the predetermined time has elapsed from starting supplying the electric power supply from the drive battery 11 of the vehicle 10 to the V2X device 31 or to the power source apparatus 32. If the result of the determination is True (Yes) and thus the predetermined time has elapsed from starting supplying the electric power from the drive battery 11 of the vehicle 10 to the V2X device 31 or to the power source apparatus 32, it proceeds to Step S16. On the other hand, if the result of the determination is False (No) and the predetermined time has not yet elapsed from starting supplying the electric power from the drive battery 11 of the vehicle 10 to the V2X device 31 or to the power source apparatus 32, it proceeds to Step S14. It should be noted that the predetermined time is defined as, for example based on a maximum output power of the power source apparatus 32, a period of time in which the remaining capacity of the drive battery 11 decreases to a predetermined SOC or below while the power source apparatus 32 continues outputting the maximum power.

In Step S14, it is determined whether or not the remaining battery capacity takes a value equal to or less than the predetermined SOC (e.g., 30%) (i.e. a predetermined value). Specifically, it is determined whether or not the remaining battery capacity monitored by the battery monitoring unit 17 takes a value equal to or less than the predetermined SOC. If the result of the determination is True (Yes) and thus the remaining battery capacity is equal to or less than the predetermined SOC, it proceeds to Step S16. On the other hand, if the result of the determination is False (No) and the remaining battery capacity is neither equal to nor less than the predetermined SOC, it returns to Step S12. It should be noted that the remaining battery capacity referred here is calculated based on an integrated value of the current supplied from the drive battery 11 of the vehicle 10 to the V2X device 31 or to the power source apparatus 32. The predetermined SOC is set to a battery capacity at and above which performance degradation of the drive battery 11 is not caused by its over-discharging.

Also in Step S16, the quick charging contactors 11c are shut off. That is, the quick charging contactors 11c are shut off to stop supplying the electric power from the drive battery 11 to the V2X device 31 or to the power source apparatus 32. Then, it proceeds to Step S18. It should be noted that the electric power stored in the capacitor 32c within the power source apparatus 32 is supplied to the electrical device connected to the power source apparatus 32, when the power source apparatus 32 is connected to the vehicle 10.

In Step S18, failure diagnosis is initiated. In particular, the diagnosis of adhesion of the quick charging contactors 11c and electric leak in the drive battery 11, on the basis of the current value detected by the battery monitoring unit 17 and on the operation of the quick charging contactors 11c.

In Step S20, it is determined whether or not adhesion of the quick charging contactors 11c has occurred. For example, when the quick charging contactors 11c or the main contactors 11d do not operate even though it is controlled so that the quick charging contactors 11c is shut off, it is judged that adhesion has occurred in the quick charging contactors 11c. For instance, when the current flowing through the quick charging high-voltage lines 12a and 12b does not become zero even though the quick charging contactors 11c are controlled to be shut off, it is judged that adhesion has occurred in both quick charging contactors 11c provided in the respective high-voltage lines 12a and 12b. Alternatively, a device for detecting the operation of a contactor may be incorporated into each contactor so that adhesion of the contactor can be determined by the incorporated device, though not explained herein in detail. Further, although not explained in detail, the voltages of the high-voltage lines may be detected using voltmeters, not shown, disposed in the high-voltage lines so that adhesion of the contactors may be determined on the basis of the detected voltages. Also, the above methods may be used in combination to diagnose adhesion.

When the result of the determination is True (Yes), that is, if it is diagnosed that adhesion of the quick charging contactors 11c has occurred in Step S18, it proceeds to Step S32. On the other hand, when the result of the determination is False (No), that is, if no adhesion of the quick charging contactors 11c has occurred in Step S18, it proceeds to Step S22.

In Step S22, it is determined whether or not an electric leak in the drive battery 11 exists. For example, if the current value detected by a sensor provided in the drive battery 11, in particular by an electric leak sensor provided separately in the drive battery 11 besides the current sensors, does not become 0 (zero) even though the quick charging contactors 11c are shut off and the current flowing through the quick charging high-voltage lines 12a, 12b becomes zero, it is judged that there is an electric leak in the drive battery 11. Then it proceeds to Step S20. The aforementioned methods for diagnosing adhesion of the quick charging contactors 11c and electric leak in the drive battery 11 are illustrative only, and other suitable methods may be used instead.

If the result of the determination is True (Yes), that is, if an electric leak in the drive battery 11 exists in Step S18, it proceeds to Step S32. On the other hand, if the result of the determination is False (No), that is, if it is diagnosed that there is no electric leak in the drive battery 11 in Step S18, it proceeds to Step S26.

In Step S24, the open circuit voltage of the drive battery 11 is detected. Then it proceeds to Step S26.

In Step S26, the remaining battery capacity is calculated on the basis of the open circuit voltage detected in Step S24. Then it proceeds to Step S28.

In Step S28, the remaining battery capacity is memorized again. In particular, the remaining battery capacity calculated in Step S26 is memorized replacing the remaining battery capacity calculated by integrating the current value.

In Step S30, discharging is restarted. In particular, the quick charging contactors 11c are contacted to restart supplying the electric power from the drive battery 11 of the vehicle 10 to the V2X device 31 or to the power source apparatus 32. Then, the routine returns.

In Step S32, a warning is initiated. If it is determined by the aforementioned failure diagnosis that a failure in the drive battery 11 exists, this information is sent via the CAN to the V2X device 31 or the power source apparatus 32. Based on the information, a warning is initiated by means of either one of the warning devices provided to the vehicle 10, the V2X device 31, and the power source apparatus 32, indicating that a failure in the drive battery 11 exists. Then it proceeds to Step S34.

In Step S34, restart of discharge is inhibited. Specifically, the quick charging contactors 11c are kept shut off to inhibit restarting of supplying the electric power from the drive battery 11 of the vehicle 10 to the V2X device 31 or to the power source apparatus 32. Then, the routine returns.

Thus, in the electric power supply device of the present invention, starting supplying electric power from the drive battery 11 of the vehicle 10 to the V2X device 31 or to the power source apparatus 32, and when the predetermined time has elapsed from starting supplying the electric power from the drive battery 11 of the vehicle 10 to the V2X device 31 or to the power source apparatus 32 or when the remaining battery capacity becomes equal to or less than the predetermined SOC, the quick charging contactors 11c are shut off to stop supplying the electric power from the drive battery 11 to the V2X device 31 or to the power source apparatus 32. Then, it is diagnosed whether there exists adhesion of the quick charging contactors 11c and whether there is an electric leak in the drive battery 11. If there is adhesion in the quick charging contactors 11c or if there is an electric leak in the drive battery 11, a warning indicating existence of a failure of the drive battery 11 is initiated by means of any of the warning device of the vehicle 10, the warning device of the V2X device 31 and the power source apparatus 32, and the quick charging contactors 11c are kept shut off to inhibit restarting of supplying the electric power from the drive battery 11 of the vehicle 10 to the V2X device 31 or to the power source apparatus 32. On the other hand, if there is a failure neither in the drive battery 11 nor in the quick charging contactors 11c, the open circuit voltage of the drive battery 11 is detected. Then, based on the detected open circuit voltage, the remaining battery capacity is calculated and is memorized replacing the remaining battery capacity calculated by integrating the current value. Subsequently, the quick charging contactors 11c are contacted to restart supplying the electric power from the drive battery 11 of the vehicle 10 to the V2X device 31 or to the power source apparatus 32.

Thus, by interrupting supplying the electric power from the drive battery 11 to the V2X device 31 or to the power source apparatus 32 when the electric power is being supplied from the drive battery 11 to the V2X device 31 or to the power source apparatus 32, since there should be no current flowing in the drive battery 11, it is possible to detect electric leak in the drive battery 11, namely, failure in the drive battery 11 by detecting the current value of the drive battery 11. In case the quick charging contactors 11c fail to stop supplying the electric power, that is, if current keeps flowing in the drive battery 11 or if the quick charging contactors 11c, being monitored about its operation, fails to be actuated, it can be judged that adhesion has occurred in the quick charging contactors 11c, or namely it is possible to detect a failure in the quick charging contactors 11c.

Also, when supplying electric power from the drive battery 11 to the V2X device 31 or to the power source apparatus 32 is stopped, no current flows in the drive battery 11, and therefore, the open circuit voltage of the drive battery 11 can be detected. Thus, based on the detected open circuit voltage, the remaining capacity of the drive battery 11 can be calculated.

The remaining battery capacity of the drive battery 11 can therefore be calculated with higher accuracy based on the open circuit voltage, than the remaining battery capacity calculated by integrating the value of the current when supplying the electric power from the drive battery 11 to the V2X device 31 or to the power source apparatus 32.

Also, when supplying electric power from the drive battery 11 to the V2X device 31 or to the power source apparatus 32 is stopped, if the V2X device 31 is connected to the vehicle 10, the electric power supplied by an electric power provider or generated at home is supplied via the V2X device 31 to the electrical device connected thereto, or, if the power source apparatus 32 is connected to the vehicle 10, the electric power stored in the capacitor 32c within the power source apparatus 32 is supplied to the electrical device connected to the power source apparatus 32.

Thus, even when supplying electric power from the drive battery 11 to the V2X device 31 or to the power source apparatus 32 is stopped, since electric power can be supplied to the electrical device via the V2X device 31 or the power source apparatus 32, the electrical device need not be stopped and can be used continuously even when supplying electric power from the drive battery 11 to the V2X device 31 or to the power source apparatus 32 is stopped.

REFERENCE SIGNS LIST

10: vehicle
11: drive battery
11c: quick charging contactor (electric power on/off unit)
12: high-voltage line
12a, 12b: quick charging high-voltage line
13: MCU inverter
14: motor (electric motor)
17: battery monitoring unit
20: electronic control unit
31: V2X device (externally connected unit)
31a: controller
32: power source apparatus (externally connected unit)
32a: controller
32c: capacitor (reserve power supply unit)

The invention claimed is:

1. An electric power supply device using an electric vehicle, comprising:
   a drive battery installed in the electric vehicle, supplying electric power charged therein to an electric motor for driving the electric vehicle and also to outside of the electric vehicle;
   an externally connected unit arranged external to the electric vehicle, converting the electric power supplied from the drive battery and supplying the converted electric power to an electrical device located outside of the electric vehicle;
   an electric power on/off unit for on/off of supplying electric power from the drive battery to the externally connected unit;
   an operation control unit that causes the electric power on/off unit to shut off supplying the electric power from the drive battery to the externally connected unit, when a predetermined time has elapsed after start of supplying the electric power from the drive battery to the externally connected unit; and
   a state detection unit that detects a state of the drive battery when supplying the electric power is shut off by the electric power on/off unit.

2. The electric power supply device according to claim 1, wherein the predetermined time is a period of time from start of supplying the electric power from the drive battery to the externally connected unit until a remaining capacity of the drive battery decreases to a predetermined value or below.

3. The electric power supply device according to claim 2, wherein the state detection unit calculates the remaining capacity of the drive battery based on a current supplied from the drive battery to the externally connected unit when the electric power is supplied from the drive battery to the externally connected unit.

4. The electric power supply device according to claim 1, wherein the state detection unit detects a failure in the drive battery and also a failure in the electric power on/off unit when supplying the electric power is shut off by the electric power on/off unit.

5. The electric power supply device according to claim 1, wherein the state detection unit includes a voltage detection unit that detects an open circuit voltage of the drive battery, and the state detection unit calculates a remaining capacity of the drive battery based on a result of detection by the voltage detection unit when supplying the electric power is shut off by the electric power on/off unit.

6. The electric power supply device according to claim 5, wherein:
   when the remaining capacity of the drive battery is calculated based on the result of detection by the voltage detection unit, the state detection unit erases a memorized remaining capacity of the drive battery calculated based on a current supplied from the drive battery to the externally connected unit, and memorizes the remaining capacity of the drive battery calculated based on the result of detection by the voltage detection unit.

7. The electric power supply device according to claim 1, wherein:
   the externally connected unit includes a reserve power supply unit that is charged by electric power supplied from the drive battery or by electric power supplied from a power supply located outside of the electric vehicle, and
   the reserve power supply unit supplies electric power to the externally connected unit when supplying electric power is shut off by the electric power on/off unit.

8. The electric power supply device according to claim 2, wherein:
   the externally connected unit includes a reserve power supply unit that is charged by electric power supplied from the drive battery or by electric power supplied from a power supply located outside of the electric vehicle, and
   the reserve power supply unit supplies electric power to the externally connected unit when supplying electric power is shut off by the electric power on/off unit.

9. The electric power supply device according to claim 3, wherein:
   the externally connected unit includes a reserve power supply unit that is charged by electric power supplied from the drive battery or by electric power supplied from a power supply located outside of the electric vehicle, and
   the reserve power supply unit supplies electric power to the externally connected unit when supplying electric power is shut off by the electric power on/off unit.

10. The electric power supply device according to claim 4, wherein:
    the externally connected unit includes a reserve power supply unit that is charged by electric power supplied from the drive battery or by electric power supplied from a power supply located outside of the electric vehicle, and
    the reserve power supply unit supplies electric power to the externally connected unit when supplying electric power is shut off by the electric power on/off unit.

11. The electric power supply device according to claim 5, wherein:
    the externally connected unit includes a reserve power supply unit that is charged by electric power supplied from the drive battery or by electric power supplied from a power supply located outside of the electric vehicle, and
    the reserve power supply unit supplies electric power to the externally connected unit when supplying electric power is shut off by the electric power on/off unit.

12. The electric power supply device according to claim 6, wherein:

the externally connected unit includes a reserve power supply unit that is charged by electric power supplied from the drive battery or by electric power supplied from a power supply located outside of the electric vehicle, and the reserve power supply unit supplies electric power to the externally connected unit when supplying electric power is shut off by the electric power on/off unit.

13. An electric power supply device using an electric vehicle, comprising:

a drive battery installed in the electric vehicle, supplying electric power charged therein to an electric motor for driving the electric vehicle and also to outside of the electric vehicle;

an externally connected unit arranged external to the electric vehicle, converting the electric power supplied from the drive battery and supplying the converted electric power to an electrical device located outside of the electric vehicle;

an electric power on/off unit for on/off of supplying electric power from the drive battery to the externally connected unit;

an operation control unit that causes the electric power on/off unit to shut off supplying the electric power from the drive battery to the externally connected unit, when a predetermined time, which is a period of time from start of supplying the electric power from the drive battery to the externally connected unit until a remaining capacity of the drive battery decreases to a predetermined value or below, has elapsed; and a state detection unit that detects a state of the drive battery when supplying the electric power is shut off by the electric power on/off unit;

wherein the state detection unit includes a voltage detection unit that detects an open circuit voltage of the drive battery, and the state detection unit that does calculation of a remaining capacity of the drive battery based on a result of detection by the voltage detection unit when supplying the electric power is shut off by the electric power on/off unit and executes a failure diagnosis for detecting a failure of the drive battery and a failure of the electric power on/off unit, and wherein, on one hand, when a failure either of the drive battery or of the electric power on/off unit is detected, restarting of supplying the electric power from the drive battery to the externally connected unit is inhibited, and on the other hand, when no failure both of the drive battery and of the electric power on/off unit is detected, supplying the electric power from the drive battery to the externally connected unit is restarted, and wherein, after restarting of supplying the electric power, the state detection unit repeat the calculation of the remaining capacity of the drive battery and the failure diagnosis, based on a result of detection by the voltage detection unit when supplying the electric power is shut off caused by the operation control unit using the electric power on/off unit.

14. The electric power supply device according to claim 13, wherein the state detection unit calculates the remaining capacity of the drive battery based on a current supplied from the drive battery to the externally connected unit when the electric power is supplied from the drive battery to the externally connected unit.

15. The electric power supply device according to claim 14, wherein:

when the remaining capacity of the drive battery is calculated based on the result of detection by the voltage detection unit, the state detection unit erases a memorized remaining capacity of the drive battery calculated based on a current supplied from the drive battery to the externally connected unit, and memorizes the remaining capacity of the drive battery calculated based on the result of detection by the voltage detection unit.

* * * * *